United States Patent [19]

Alsobrook

[11] 4,042,002
[45] Aug. 16, 1977

[54] MOTORCYCLE TIRE

[75] Inventor: Clarence B. Alsobrook, Akron, Ohio

[73] Assignee: The Goodyear Tire & Rubber Company, Akron, Ohio

[21] Appl. No.: 672,361

[22] Filed: Mar. 31, 1976

[51] Int. Cl.² .................. B60C 9/04; B60C 9/22
[52] U.S. Cl. ................. 152/354; 152/209 R; 152/361 R; 152/353 R
[58] Field of Search ........... 152/209 R, 361 R, 353 R, 152/354

[56] References Cited

U.S. PATENT DOCUMENTS

| 3,506,052 | 4/1970 | Wittneben | 152/361 R |
| 3,568,749 | 3/1971 | Menell et al. | 152/361 R |
| 3,685,564 | 8/1972 | Smithkey, Jr. | 152/361 R |
| 3,730,245 | 5/1973 | Kusunoki et al. | 152/209 R |
| 3,760,858 | 9/1973 | Grossett | 152/361 R |

Primary Examiner—Drayton E. Hoffman
Attorney, Agent, or Firm—F. W. Brunner; R. S. Washburn

[57] ABSTRACT

A motorcycle tire particularly for racing motorcycles which has a tread, a pair of beads, and a carcass comprising a single bias ply extending to and around the beads, and a single breaker ply whose width is at least about 85 percent of the tread width and the ends of the single bias ply overlying 50 to 90 percent of the breaker ply. In its uninflated state, the cross-section of the tire suggests a triangle.

2 Claims, 1 Drawing Figure

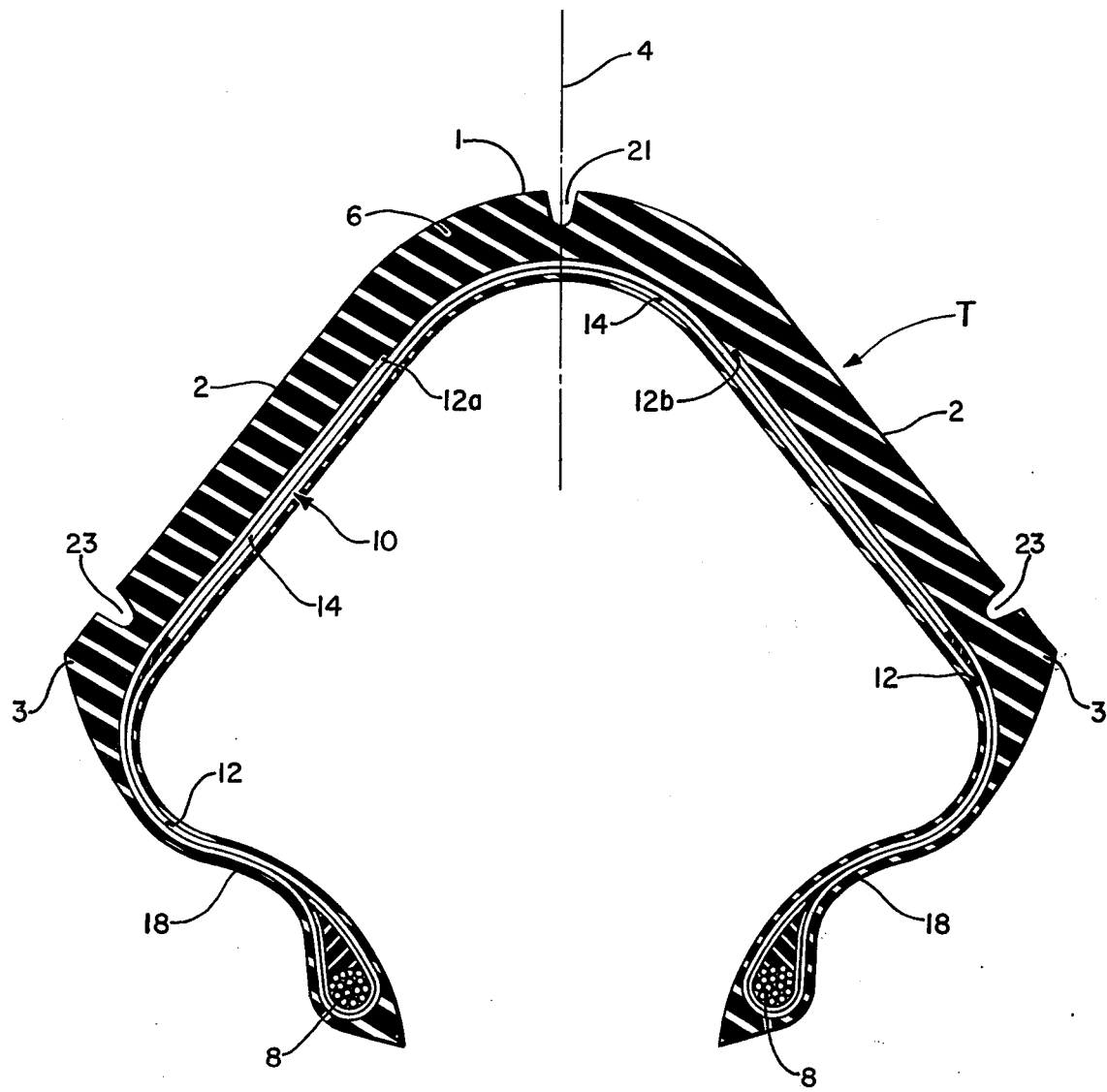

MOTORCYCLE TIRE

The present invention relates to motorcycle tires and particularly to an improved construction in tires for motorcycle racing.

Briefly, the invention provides a motorcycle tire having a tread, a pair of beads, and a carcass comprising a single ply of parallel cords extending between the beads at a bias angle of from 22° to 38° (in the cured state), a single breaker ply of parallel cords extending at a bias angle opposite to the bias angle of the cords of the first ply, the width of the breaker ply being at least 85 percent of the width of the tread, and said first ply being turned about the respective beads to overlie 50 to 90 percent of the axial width of the breaker ply.

To acquaint persons skilled in the arts most closely related to the invention, a preferred embodiment illustrating the best mode now contemplated for putting an invention into practice is described herein by and with reference to the attached drawing forming a part of this specification. The embodiment shown and described herein is illustrative and as will become apparent to those skilled in these arts can be modified in numerous ways within the spirit and scope of the invention defined in the claims hereof.

In the drawing, there is shown a single cross-section view of a tire constructed in accordance with the present invention.

As may be seen in the FIGURE, a tire T in accordance with the invention, when uninflated, has a cross-section suggesting a triangle, the tire having a central crown arc 1 and straight, sloped side portions 2 extending as the legs of an isosceles triangle from the crown arc to the respective shoulders 3 of the tread. The tire is symmetrical with respect to a mid-circumferential plane 4 and includes the tread 6, a pair of beads 8, and a carcass 10.

The carcass 10 comprises a single ply 12 of parallel cords extending between the beads at a bias angle of from 22° to 38° in the cured state, shaped as illustrated in the FIGURE. The carcass also includes a single breaker ply 14 of parallel cords which extends at bias angles opposite and preferably equal to the bias angle of the cords of the first ply, the width of the breaker ply being at least 85 percent of the width of the tread. The single first ply 12 is turned about the beads 8 and extends radially outwardly overlying the portion thereof between the beads and the single breaker ply 14 to about 50 to 90 percent of the width of the breaker ply. The extremities 12a and 12b of the first ply preferably extend upwardly about to the tangent points, that is, to the respective points where the straight, sloped side portion of the tread joins the crown arc.

The contour length of the tire section comprising the sidewalls 18, being those portions between the beads 8 and the shoulders 3, are rendered very flexible. Since the edges 12a, 12b of the turned-up ply do not terminate in the sidewalls 18 but extend upward beneath the tread 6, the sidewalls are free from the stiffening influence and discontinuity in flexure resulting from a termination of turned-up ply in the sidewall.

A further advantage lies in the improved control of the flow of the tread rubber during the molding and curing. The presence of the turned up first ply endings tends to counteract the movement of tread rubber toward the crown arc during molding.

Preferably, the tire is cured in a mold having a shape conjugate to that of the tire illustrated in the FIGURE and with a smooth tread. A conventional centerline groove 12 may be carved in the tread subsequent to curing or may be included in the mold if desired. The conventional circumferential grooves 23 adjacent the shoulders are preferably carved in the tread of the tire subsequent to its molding.

When inflated and mounted for use, the tire will assume a more rounded shape than the section illustrated in the figure. The straight sloped side portions 2 become curved and the crown arc curvature becomes somewhat decreased.

The particular material of the cords of the first ply and of the breaker ply are not material to, nor within the scope of the invention. However, in the tire described, both the single first ply and the breaker ply are of nylon, 840/2 cord construction having 22 ends per inch.

While certain representative embodiments and details have been shown for the purpose of illustrating the invention, it will be apparent to those skilled in the art that various changes and modifications may be made therein without departing from the spirit or scope of the invention.

What is claimed is:

1. A motorcycle tire comprising a tread terminating in axially spaced circumferential shoulders, a pair of beads, and sidewalls having improved uniformity of flexure, said tire having a carcass consisting of a single bias carcass ply of cord angles of 20° to 38° (in the cured state) extending between the beads, and a single bias breaker ply of bias cord angles equal and opposite to the bias cord angles of the carcass ply disposed symmetrically and circumferentially about the carcass ply and terminating between the shoulders, said carcass ply being lapped under the beads and turned outward to extend through and beyond the sidewalls to overlie 50 to 90 percent of the breaker ply and between the breaker ply and the tread, whereby said motorcycle tire is provided with sidewalls free of discontinuity and the carcass ply turned about the beads terminates beneath the tread and radially outwardly of the shoulders thereof.

2. A motorcycle tire as claimed in claim 1, said tire when uninflated and dismounted having a cross-section suggesting a triangle, the tire having a central crown arc and straight sloped side portions from the crown arc to the shoulders of the tread.

* * * * *

UNITED STATES PATENT OFFICE
CERTIFICATE OF CORRECTION

PATENT NO. : 4,042,002
DATED : August 16, 1977
INVENTOR(S) : Clarence B Alsobrook It is certified that error appears in the above-identified patent and that said Letters Patent are hereby corrected as shown below:

Claim 1, line 39, "20°" should read -- 22° --

Signed and Sealed this

Twenty-second Day of November 1977

[SEAL]

Attest:

RUTH C. MASON
Attesting Officer

LUTRELLE F. PARKER
Acting Commissioner of Patents and Trademarks